Figure 1:
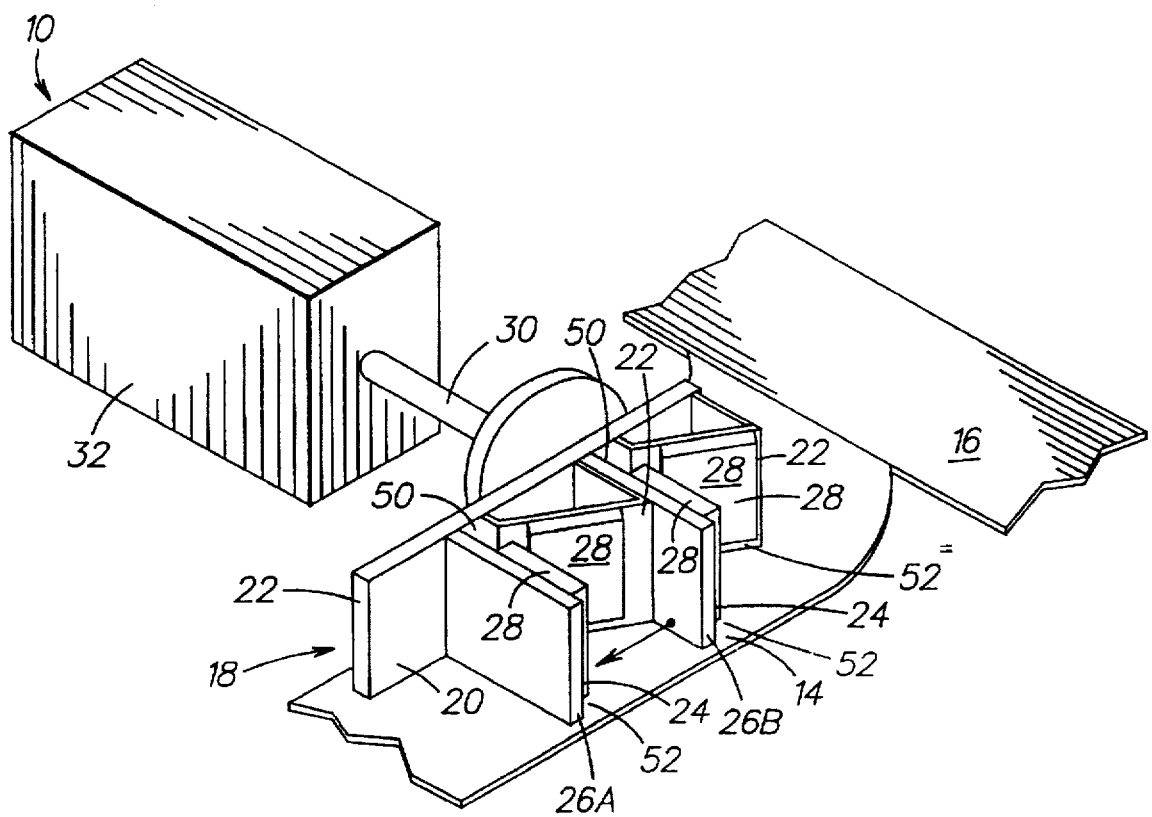

United States Patent [19]
Voisine et al.

[11] Patent Number: 5,733,354
[45] Date of Patent: Mar. 31, 1998

[54] PUSHER MECHANISM FOR I.S. GLASS FORMING MACHINE

[75] Inventors: Gary R. Voisine, East Hartford; Vaughan Abbott, East Hartland, both of Conn.

[73] Assignee: Emhart Glass Machinery Investments Inc., Wilmington, Del.

[21] Appl. No.: 769,570

[22] Filed: Dec. 19, 1996

[51] Int. Cl.$^6$ .................................................. C03B 9/453
[52] U.S. Cl. .................. 65/260; 65/375; 198/468.01; 198/740; 198/749; 294/64.3
[58] Field of Search ..................... 65/260, 241, 239, 65/348, 375, 323, 227, 111; 198/468.01, 740, 433, 722, 723, 734, 736, 749; 414/744.1, 744.2; 294/64.3

[56] References Cited

U.S. PATENT DOCUMENTS

| | | | |
|---|---|---|---|
| 3,400,802 | 9/1968 | Rowe | 198/468.01 |
| 4,462,519 | 7/1984 | Parkell et al. | 198/740 |
| 4,466,532 | 8/1984 | Minneman et al. | 198/468.01 |
| 4,502,721 | 3/1985 | Savin-Czeizler et al. | 294/64.3 |
| 4,771,878 | 9/1988 | Braithwaite et al. | 65/260 |
| 4,927,444 | 5/1990 | Voisine et al. | 65/375 |
| 5,527,372 | 6/1996 | Voisine et al. | 65/260 |

*Primary Examiner*—Steven P. Griffin
*Attorney, Agent, or Firm*—Spencer T. Smith

[57] ABSTRACT

A pusher mechanism for transferring a selected number of containers from a dead plate of an I.S. machine to a conveyor. The mechanism has a finger assembly including a back support portion and a finger portion, with the back support portion and the finger portion defining a pocket having a corner at their juncture. The finger portion has an air jet with the center line thereof making an acute angle with the finger portion and selectively located so that a bottle placed on the deadplate within the pocket will be located on the side of the center line remote from the corner of the pocket, and the back support portion is selectively inclined to the finger portion to substantially prevent the bouncing of a bottle, drawn into the pocket by the air jet, off the finger portion in the direction of the air jet.

5 Claims, 2 Drawing Sheets

PUSHER MECHANISM FOR I.S. GLASS FORMING MACHINE

The present invention relates to machinery for manufacturing glass containers, and specifically, to a pushout mechanism which transfers glass containers formed by a section of an I.S. (individual section) machine and deposited on a dead plate by a take out device, to a moving conveyor which delivers the bottles to a Lehr for heat conditioning.

In state of the art pushers, such as disclosed in U.S. Pat. No. 5,527,372, where a bottle receiving pocket is defined by a back support and a 90° related finer, a bottle is deposited at a desired location within the pocket where a pressurized air discharge passage on the finger will aim a jet of air against the container at a location inwardly of its axis so that more air will pass around the container inwardly towards the pocket corner than outwardly around the container whereby the container will be forced into the corner of the pocket. When very small containers are produced, they often have to be deposited far from the corner of the pocket to avoid an interference between the take out mechanism which deposits the bottle and the pocket. As a result, the distance travelled by the bottle can be substantial (relative to the size of the bottle) and the developed bottle velocity can be substantial enough to bounce the bottle off the finger and away from the finger in the direction of the air jet against the vertically extending back support and out of the control of the air jet.

It is accordingly an object of the present invention to overcome this problem.

Other objects and advantages of the present invention will become apparent from the following portion of this specification and from the accompanying drawings which illustrate in accordance with the mandate of the patent statutes a presently preferred embodiment incorporating the principles of the invention.

Figure 2:
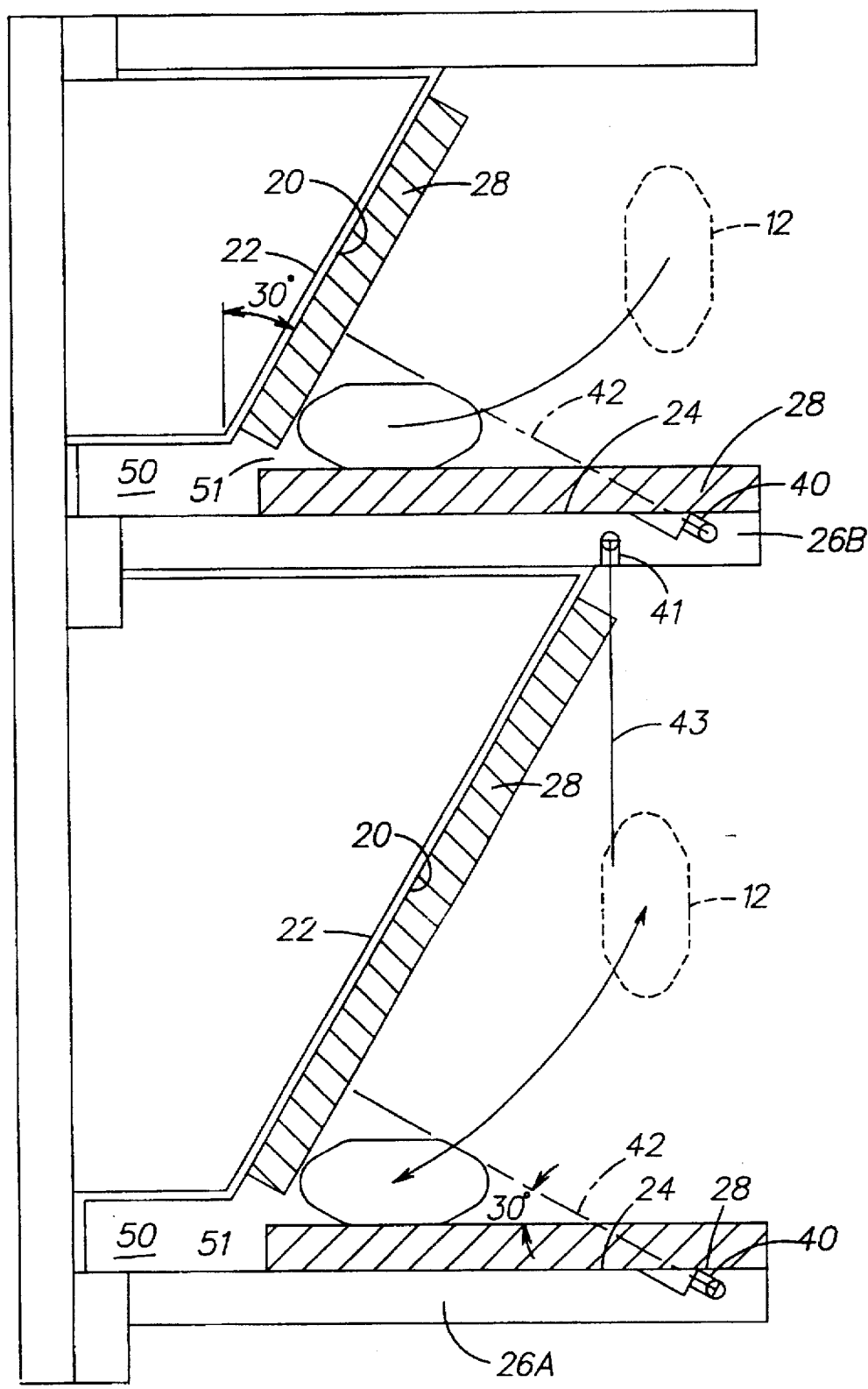

Referring to the drawings:

FIG. 1 is an oblique view of a portion of a pusher mechanism made in accordance with the teachings of the present invention; and FIG. 2 schematically illustrates how the invention operates.

A pusher mechanism 10 is used to push glass bottles 12 (FIG. 2) made in one section of an I.S. machine, from a dead plate 14 to a transversely moving conveyor 16. Each bottle (container) is deposited within a pocket of a finger assembly 18 defined by the front surface 20 of a back support 22 and the forward face 24 of a finger 26A, 26B which extends radially (is oriented transverse to the direction of a displacement of the finger assembly). Suitable bottle engaging pads 28 are secured to these surfaces to minimize damage to the containers. The finger assembly is secured to an advanceable rod 30 of a cylinder mechanism supported within a suitable housing 32 and the housing is supported for rotation so that the finger assembly can be rotated to locate the bottles, in line, on the conveyor. As shown the machine is a double gob machine which makes two bottles at a time in a section but the pusher could be used on machines handling a different number of gobs.

Referring to FIG. 2, at the free end of each finger 26A, 26B, on the front surface thereof, is defined an air passage 40 which horizontally jets pressurized air, down in the region of the heel of a container, at an angle of approximately 30° with the finger. As can be seen from FIG. 2, the bottles (the deposited bottles are shown in dotted lines) are deposited at a location far from the corner of their pocket on the side of the air jet centerline 42 remote from the corner of the pocket. Looking initially at the top pocket, the back support 22 (and the pad 28 secured thereto) is inclined outwardly from the corner of the pocket so that the pocket walls define an acute angle. As shown, the back supports are inclined by approximately 30° so that the air jet and back support are approximately square. The jet of air is aimed (the centerline of the jet 42) so that more air passes clockwise around the bottle than counterclockwise and the jet of air draws the bottle downwardly and leftwardly towards and into the corner of the pocket. A groove 52 is provided beneath each pad so that air can continue to flow clockwise around the bottle while it is in the corner of the pocket to hold it there. A bottle can not bounce off the finger, when it engages the pocket as shown in solid line in the upper and lower pockets, in the direction of the air jet, since the inclined back support pad 28 prevents such movement. When the bottle, as shown in the lower pocket, is so far above the pocket air jet that it does not displace the bottle in the desired way, an additional air passage 41 on the back surface of the other finger 26B directs a supplemental jet of air horizontally slightly above the deadplate towards the bottle (the air jet has a centerline which extends transversely to the lower finger and preferably perpendicularly to the lower finger) to displace the bottle downwardly and inwardly until the bottle is controlled by the air jet at the end of the finger 26A to locate the bottle in the corner of the pocket. The direction of the supplemental air jet (the centerline 43) can be adjusted to achieve the best results.

In either case a vertical chamber 50 open at the top, defined behind the corner of the pocket and communicating with the pocket through a separation 51 between the back support and the finger will dissipate jetted air, not otherwise distributed through the bottom grooves 52.

We claim:

1. A pusher mechanism for transferring a selected number of containers from a deadplate of an I.S. machine to a conveyor comprising a finger assembly including a back support portion, and a finger portion connected to said back support portion, said back support portion and said finger portion defining a pocket having a corner at the juncture thereof, said finger portion including means for issuing a horizontal air jet with the centerline thereof making an acute angle with said finger portion and selectively located so that a bottle placed on the deadplate within the pocket will be located on the side of said centerline remote from the corner of the pocket so that said air jet will pull the bottle towards the corner of the pocket, and said back support portion being selectively inclined to said finger portion to substantially prevent a bottle, drawn into said pocket by said air jet, from bouncing off said finger portion in the direction of said air jet.

2. A pusher mechanism for transferring a selected number of containers from a deadplate of an I.S. machine to a conveyor according to claim 1, wherein said back support portion is substantially square with said air jet.

3. A pusher mechanism for transferring a selected number of containers from a deadplate of an I.S. machine to a conveyor according to claim 1, further comprising means for displacing said finger assembly about a selected pivot location, and wherein said finger portion is oriented radially.

4. A pusher mechanism for transferring a selected number of containers from a deadplate of an I.S. machine to a conveyor according to claim 1, further comprising means for directing a second horizontal air jet having a centerline extending transversely to said finger portion and aimed at a deposited bottle towards said finger portion for displacing the bottle towards the corner of the pocket.

5. A pusher mechanism for transferring a selected number of containers from a deadplate of an I.S. machine to a conveyor according to claim 4, wherein said second horizontal air jet centerline extends perpendicularly to said finger portion.

* * * * *